United States Patent
Yamaguchi et al.

(10) Patent No.: US 9,150,281 B2
(45) Date of Patent: Oct. 6, 2015

(54) BICYCLE REAR DERAILLEUR

(75) Inventors: Sota Yamaguchi, Osaka (JP); Shinya Oseto, Osaka (JP); Takeshi Murasaka, Osaka (JP)

(73) Assignee: Shimano Inc., Osaka (JP)

(*) Notice: Subject to any disclaimer, the term of this patent is extended or adjusted under 35 U.S.C. 154(b) by 279 days.

(21) Appl. No.: 13/246,001

(22) Filed: Sep. 27, 2011

(65) Prior Publication Data
US 2013/0079184 A1 Mar. 28, 2013

(51) Int. Cl.
| F16H 9/00 | (2006.01) |
| F16H 59/00 | (2006.01) |
| F16H 61/00 | (2006.01) |
| F16H 63/00 | (2006.01) |
| B62M 9/124 | (2010.01) |
| B62M 9/1248 | (2010.01) |

(52) U.S. Cl.
CPC .............. *B62M 9/124* (2013.01); *B62M 9/1248* (2013.01)

(58) Field of Classification Search
CPC .... F02B 2075/027; F02B 63/02; F01L 1/024; F16H 3/54; F16H 55/36
USPC ...................................... 474/80, 82
See application file for complete search history.

(56) References Cited

U.S. PATENT DOCUMENTS

| 3,181,383 | A | * | 5/1965 | Juy .................................. 474/82 |
| 3,364,763 | A | * | 1/1968 | Juy .................................. 474/82 |
| 3,535,950 | A | * | 10/1970 | Shimano et al. ........... 74/473.14 |
| 4,259,873 | A | * | 4/1981 | Nagano et al. ................... 474/82 |
| 5,518,456 | A | * | 5/1996 | Kojima et al. .................... 474/77 |
| 5,533,937 | A | * | 7/1996 | Patterson et al. ................ 474/80 |
| 5,620,383 | A | * | 4/1997 | Patterson et al. ................ 474/80 |
| 5,860,880 | A | * | 1/1999 | Oka ................................ 474/77 |
| 5,897,451 | A | * | 4/1999 | Ichida ............................. 474/82 |
| 6,093,122 | A | * | 7/2000 | McLaughlin et al. ........... 474/82 |
| 6,290,621 | B1 | * | 9/2001 | Ichida ............................. 474/80 |
| 6,997,835 | B2 | * | 2/2006 | Fukuda ........................... 474/82 |
| 7,290,458 | B2 | * | 11/2007 | Fukuda ........................... 74/82 |
| 7,467,567 | B2 | * | 12/2008 | Fukuda ......................... 74/412 R |
| 7,527,571 | B2 | * | 5/2009 | Shahana .......................... 474/82 |
| 2005/0187048 | A1 | * | 8/2005 | Fukuda ............................ 474/70 |

* cited by examiner

*Primary Examiner* — Henry Liu
(74) *Attorney, Agent, or Firm* — Global IP Counselors

(57) ABSTRACT

A bicycle rear derailleur is basically provided with a base member, a cable operated structure, a movable member and a biasing member. The movable member is movably supported to the base member by the cable operated structure to move between a plurality of shift stage positions with respect to the base member. The biasing member is interposed between the first and second link members such that the movable member is biased towards one of a top shift stage position and a low shift stage position. The cable operated structure and the biasing member configured balance an operation energy used for shifting between each of the shift stage positions.

12 Claims, 6 Drawing Sheets

BICYCLE REAR DERAILLEUR

BACKGROUND

1. Field of the Invention

This invention generally relates to a motorized rear derailleur. More specifically, the present invention relates to a motorized rear derailleur that generates electrical energy.

2. Background Information

A bicycle rear derailleur is used to selectively move a chain from one of a plurality of sprockets to another for changing speeds of the bicycle. A typical rear derailleur has a base member, a movable member supporting a chain guide and a linkage assembly (e.g., a moving mechanism) coupled between the base member and the movable member so that the chain guide moves laterally relative to the base member. The base member is typically coupled to the rear end of the bicycle frame by a bolt that forms a B-axle for providing limited rotation with respect to the bicycle frame. The chain guide typically includes a pair of guide plates that rotatably support a guide pulley and a tension pulley between the guide plates. The chain guide is typically coupled to the movable member by a shaft that forms a P-axle for providing limited rotation of the chain guide with respect to the movable member. The linkage assembly typically includes a pair of pivotal links pivotally coupled to both the base member and the movable member. A spring typically biases the chain guide to an innermost or outermost position relative to the rear sprockets. A Bowden-type control cable with an outer sheath and an inner wire is typically coupled between the rear derailleur and a conventional shift control device. Thus, the chain guide can be moved laterally by moving the linkage assembly via the inner wire. In particular, one end of the control cable is typically connected to one of the links, and another end of the control cable is connected to a shift control device mounted on the bicycle handlebar. When the rider operates the shift control device, the operating cable is pulled or released accordingly. Pulling the inner wire moves the chain guide against the biasing force of the spring, while releasing the inner wire causes the chain guide to move due to the biasing force of the spring.

SUMMARY

One aspect presented in this disclosure is to provide a rear derailleur that balances an operation energy used for shifting between each of the shift stage positions.

In view of the state of the known technology, a bicycle rear derailleur is provided that basically comprises a base member, a cable operated structure and a movable member. The base member includes a bicycle mounting portion. The cable operated structure is movably coupled to the base member. The movable member is movably supported to the base member by the cable operated structure between a plurality of shift stage positions with respect to the base member. The plurality of shift stage positions include a top shift stage position, a low shift stage position and at least three shift stage positions between the top shift stage position and the low shift stage position. The cable operated structure is coupled and arranged between the movable member and the base member such that a percentage of a rate of change of operating energy in two adjacent shifting operations between each three consecutive shift stage positions of the movable member relative to the base member excluding the top and low shift stage positions is less than 3.7%. The percentage of the rate of change of the operating energy is determined as by the following equation:

$$X = |E_1 - E_2|/E\mathrm{avg}_1 \times 100 (\%)$$

where, X is the rate of change of the operating energy, $E_1$ is an operating energy for shifting between a N shift stage position and a N+1 shift stage position, with the N shift stage position excluding both the top and low shift stage positions, and $E_2$ is an operating energy for shifting between a N+1 shift stage position and a N+2 shift stage position, with the N+2 shift stage position excluding both the top and low shift stage positions, and $E\mathrm{avg}_1$ is average operation energy between the operating energies $E_1$ and $E_2$.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
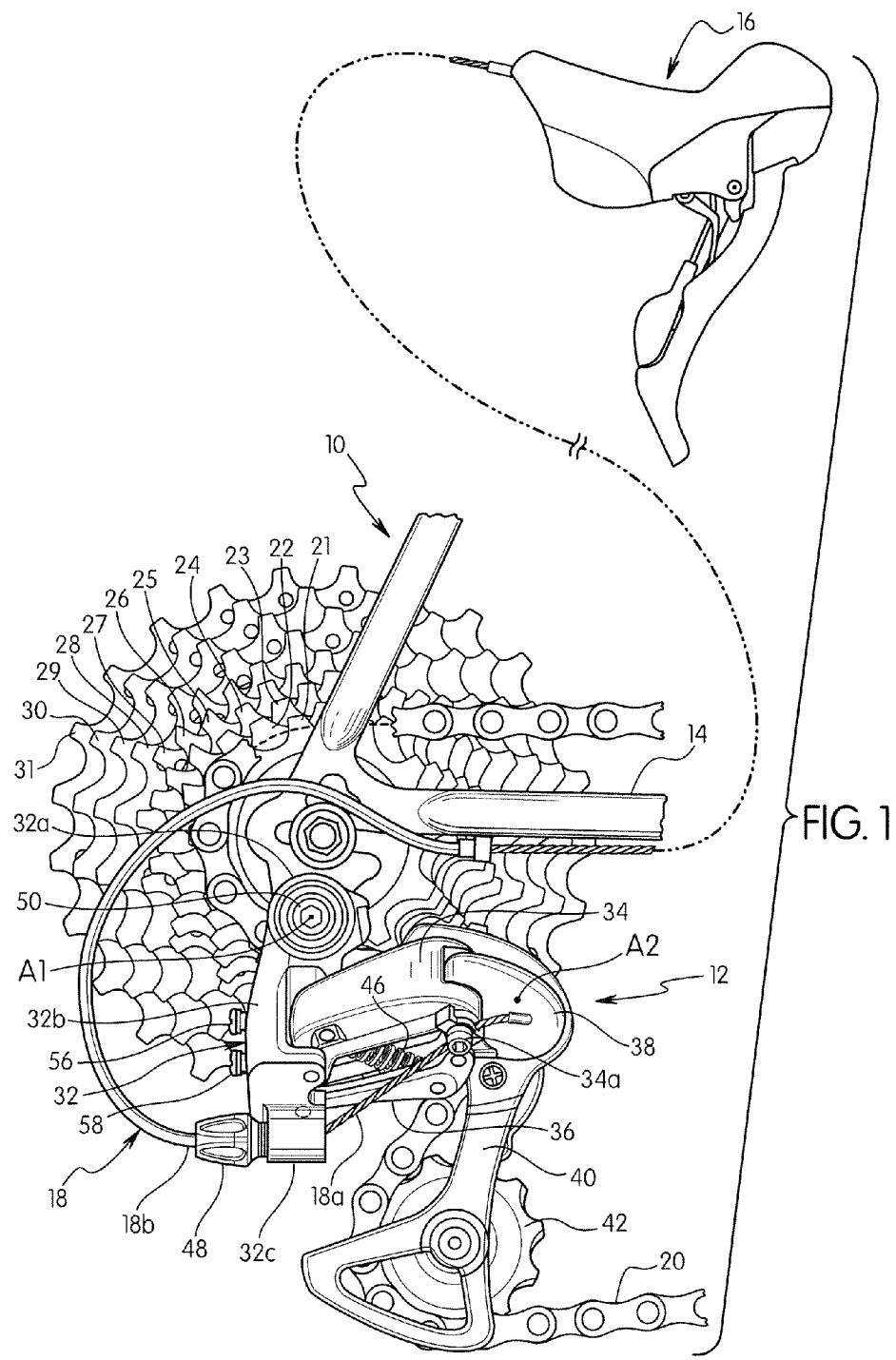
FIG. 1 is a side elevational view of a bicycle gear shift system that includes a rear shifter and a rear derailleur in accordance with one illustrative embodiment.
Figure 2:
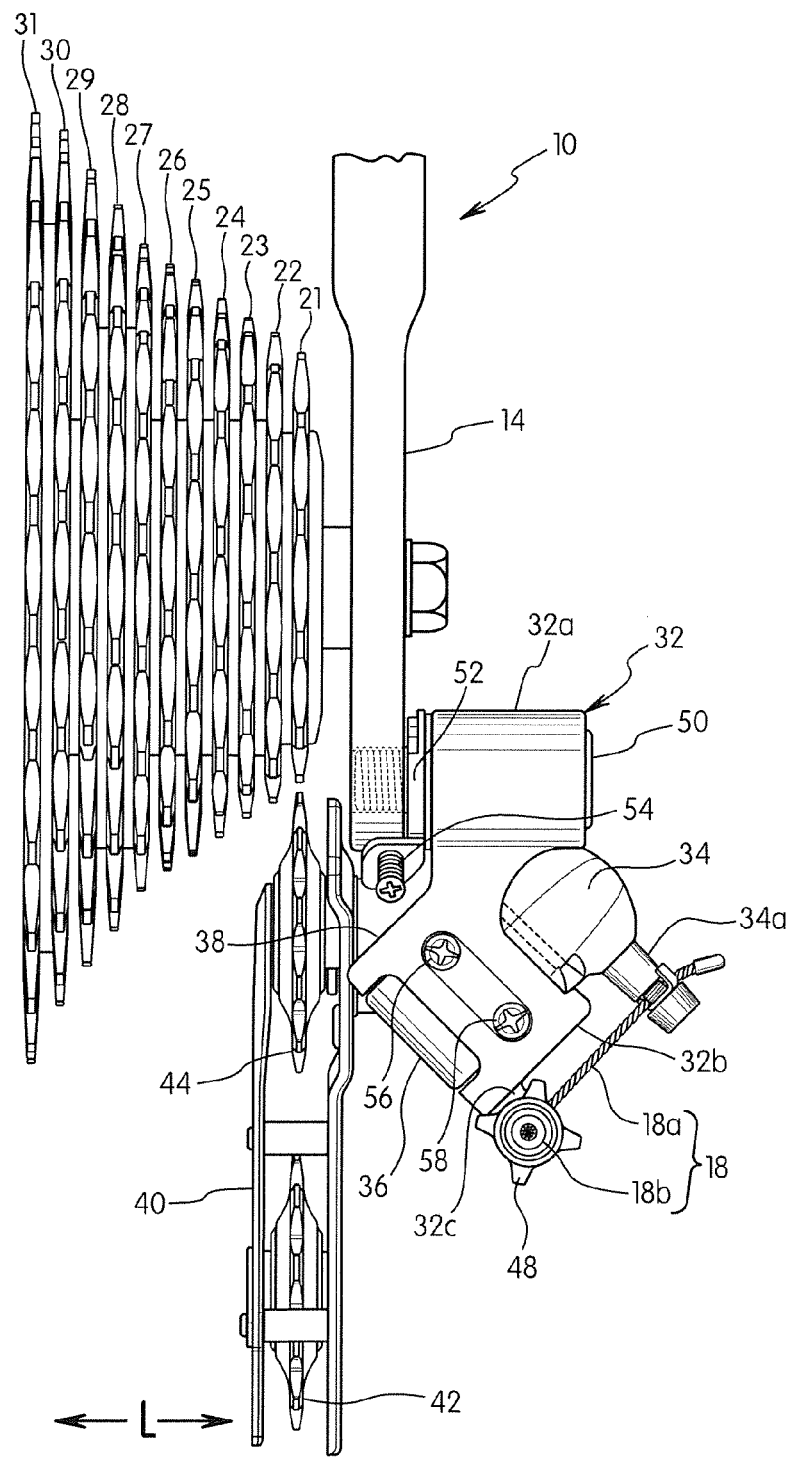
FIG. 2 is a rear elevational view of the rear derailleur in a top shift stage position.
Figure 3:
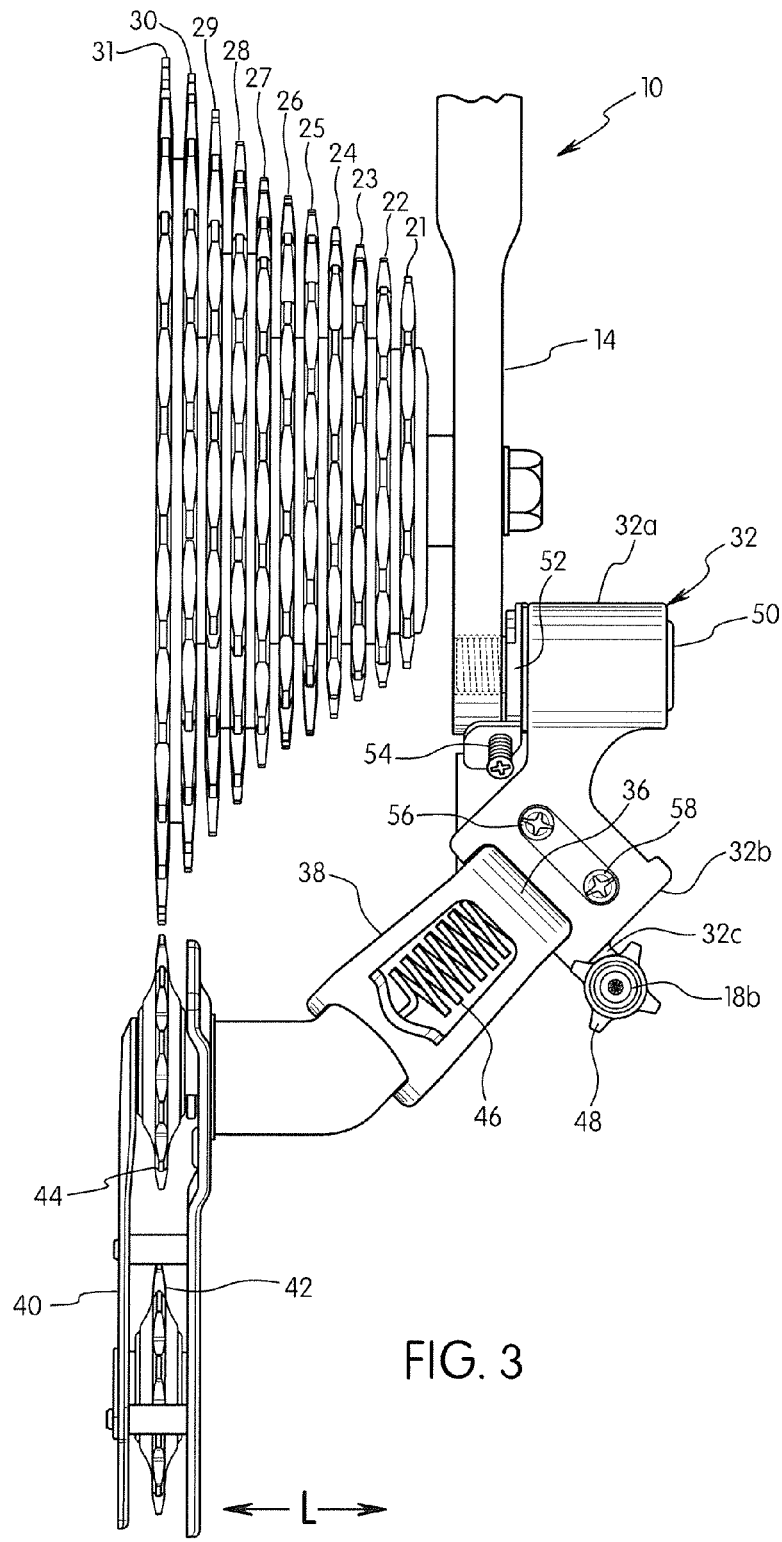
FIG. 3 is a rear elevational view of the rear derailleur in a low shift stage position.

Referring initially to FIGS. 1 to 3, a portion of a bicycle 10 is illustrated that includes, among other things, a bicycle rear derailleur 12 in accordance with a first embodiment. The rear derailleur 12 is secured to a rear portion of a bicycle frame 14 in a conventional manner. The rear derailleur 12 is operated by a rear shifter 16, which is a conventional shift actuating device. In the illustrated embodiment, the rear shifter 16 is a road style shifter that is mounted on a dropdown handlebar (not shown). In any event, the rear shifter 16 is typically mounted on the bicycle 10 in a location that is convenient for the rider to operate the rear shifter 16 while riding. The rear derailleur 12 is operatively connected to the rear shifter 16 by a conventional control cable 18. More particularly, the rear shifter 16 is configured and arranged to operate the rear derailleur 12 between a plurality of shift stage positions such that a chain 20 is moved by the rear derailleur 12 in a lateral direction L between a plurality of rear sprockets 21 to 31.

The rear derailleur 12 is illustrated in a top shift stage position in FIG. 2 and in a low shift stage position in FIG. 3. As used herein, the term "top shift stage position" refers to a rear derailleur being in a position that corresponds to a chain being guided onto the rear sprocket with the smallest number of teeth (e.g., the rear sprocket 21). As used herein, the term "low shift stage position" refers to a rear derailleur being in a position that corresponds to a chain being guided onto the rear sprocket with the largest number of teeth (e.g., the rear sprocket 31) of the cassette. Typically, rear derailleurs are specifically designed for a given number of speeds (i.e., for use with a given number of sprockets). In any case, a rear cassette has a predetermined axial width with the given number sprockets being spaced apart by a predetermined axial spacing for a given number of speeds. Thus, the rear derailleur will have a range of movement and will move a predetermined amount to perform a shift from one sprocket to the next adjacent sprocket. As used herein in connection with the relationship between adjacent sprockets and/or adjacent shift stage positions, the term "adjacent" refers to sprockets and/or shift stage positions that are immediately next to each other without any intervening sprockets and/or shift stage positions therebetween.

As seen in FIGS. 2 and 3, in the illustrated embodiment, the rear derailleur 12 is dimensioned to accommodate eleven shift stage positions. However, the rear derailleur 12 can be used with gear shift systems having fewer stages such as five to ten shift stage positions (i.e. the plurality of shift stage positions including a top shift stage position, a low shift stage position and at least three shift stage positions between the top shift stage position and the low shift stage position).

Referring now to FIGS. 1 to 3, the rear derailleur 12 basically includes a base member 32, a first link member 34, a second link member 36 and a movable member 38. A chain guide 40 is pivotally attached to the movable member 38. The chain guide 40 rotatably supports a tension pulley 42 and an idler or guide pulley 44. The first and second link members 34 and 36 form a moving mechanism or a cable operated structure that is coupled between the base member 32 and the movable member 38 so that the movable member 38 and the chain guide 40 are movable relative to the base member 32 in the lateral direction L. In other words, the cable operated structure (e.g., the link members 34 and 36) is movably coupled to the base member 32 and the movable member 38 such that the movable member 38 is movable relative to the base member 32 between a plurality of shift stage positions. A spring or biasing member 46 is operatively connected between the first and second link members 34 and 36 for biasing the movable member 38 and the chain guide 40 towards the top shift stage position as discussed below.

In the illustrated embodiment, the control cable 18 is a Bowden cable that basically includes an inner wire 18a that is slidably disposed within an outer casing 18b. The inner wire 18a is coupled to one of the first and second link members 34 and 36 (e.g., the inner wire 18a is coupled to the first link member 34 in the illustrated embodiment) to move the movable member 38 and the chain guide 40 laterally relative to the base member 32. As explained below, an operating force or operating energy is applied to the inner wire 18a for performing shifting operations between the shift stage positions. The amount of the operating energy for shifting depends on the biasing force of the biasing member 46 and the amount that the inner wire 18a is moved between adjacent shift stage positions.

As seen in FIGS. 2 and 3, in the case of an 11-speed cassette (the illustrated embodiment) for example, the sprocket 21 has an axial thickness of 1.82 millimeters, the sprocket 22 has an axial thickness of 1.78 millimeters, and each of the sprockets 23 to 31 has an axial thickness of 1.6 millimeters. Also for example, the rear sprockets 21 and 22 are axially spacing apart by 2.0 millimeters, the rear sprockets 22 and 23 are axially spacing apart by 2.1 millimeters, and the sprockets 23 to 31 are each axially spacing apart by 2.18 millimeters. Thus, the overall axial dimension of the 11-speed cassette of the illustrated embodiment is 39.54 millimeters. However, for a rear cassette with fewer than eleven sprockets, the sprocket thickness will typically range from 1.6 to 2.35 millimeters and the axial spacings between the rear sprockets will typically range from 2.35 to 3.95 millimeters. For example, the overall axial dimension of a regular 5-speed cassette is typically about 23.2 millimeters with a sprocket thickness of 1.85 millimeters and an axial spacing of 3.5 millimeters. Accordingly, the axial thicknesses of the sprockets 21 to 31 and the axial spacings between the sprockets 21 to 31 will vary depending on the particular the drive train design. In any case, to perform a single shift, the movable member 38 and the chain guide 40 are moved relative to the base member 32 by an axial distance (e.g., 1.8 millimeters to 3.5 millimeters) in the lateral direction L that corresponds to the axial spacing between the rear sprockets 21 to 31.

As seen in FIGS. 1 to 3, the base member 32 includes a bicycle mounting portion 32a, a link supporting portion 32b and a cable attachment portion 32c with a cable adjustment barrel 48. The base member 32 is preferably constructed of a hard rigid material such as a lightweight metal (e.g., an aluminum alloy). The bicycle mounting portion 32a has a fixing bolt 50 for securing the rear derailleur 12 to the rear portion (e.g., the derailleur hanger) of the frame 14 of the bicycle 10. The fixing bolt 50 is threaded into a threaded hole of the bicycle frame 14. The fixing bolt 50 defines a pivot axis A1, which is sometimes called the B-axis of the rear derailleur. The pivot axis A1 is parallel to the lateral direction L. Thus, when the movable member 38 and the chain guide 40 are moved relative to the base member 32 in the lateral direction L between the shift stage positions, the movable member 38 and the chain guide 40 are also moving in a direction parallel to the pivot axis A1.

The bicycle mounting portion 32a preferably includes a biasing arrangement (not shown) that is operatively arranged between the bicycle mounting portion 32a and the bicycle frame 14 in a conventional manner. In this embodiment, as seen in FIGS. 2 and 3, the base member 32 includes a stopper plate 52 that is rotatably mounted to the fixing bolt 50 with a torsion spring (not shown) coaxially disposed on the fixing bolt 50 to biased the base member 32 in a clockwise direction relative to the stopper plate 52 as viewed along the fixing bolt 50 from the side of the bicycle 10 where the rear derailleur 12 is attached. In this case, one end of a torsion spring is attached to the base member 32, and another end of the torsion spring is attached to the stopper plate 52. Often, an adjusting bolt 54 that screws into the stopper plate 52 to contact an abutment formed on the frame end. Such an arrangement for a rear derailleur is disclosed in U.S. Pat. No. 4,690,663 (assigned to Shimano, Inc.).

As seen in FIGS. 2 to 5, the bicycle mounting portion 32a is also provided with a top limit screw 56 and a low limit screw 58. The top limit screw 56 is threaded into a threaded hole of the bicycle mounting portion 32a such that a tip of the top limit screw 56 contacts the second link member 36 to set the top shift stage position. The low limit screw 58 is threaded into a threaded hole of the bicycle mounting portion 32a such that a tip of the low limit screw 58 contacts the first link member 34 to set the low shift stage position. Thus, by selectively turning the limit screws 56 and 58, the user can adjust the ends of the movement range of the movable member 38 and the chain guide 40 relative to the base member 32. Since the overall axial dimension of the sprockets 21 to 31 (11-speed cassette) is 39.54 millimeters, the derailleur 12 is configured and arranged with a movement range of the movable member 38 and the chain guide 40 relative to the base member 32 of at least 39.54 millimeters. Preferably, the movement range of the movable member 38 and the chain guide 40 relative to the base member 32 is greater than 39.54 millimeters so that the positions of the movable member 38 and the chain guide 40 in the top and low shift stage positions can be adjusted in the lateral direction L relative to the base member 32.

Figure 4:
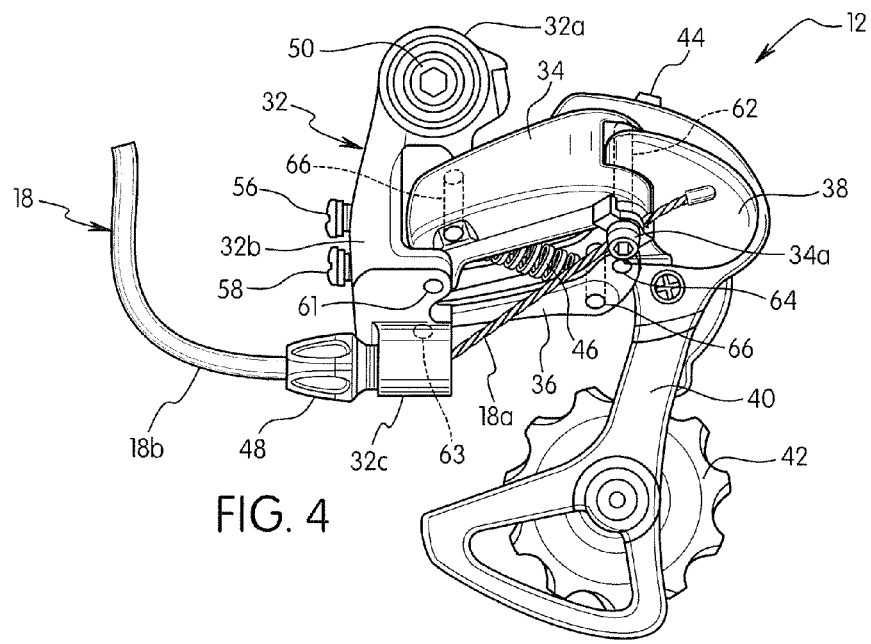
FIG. 4 is an enlarged side elevational view of the rear derailleur illustrated in the top shift stage position.
Figure 5:
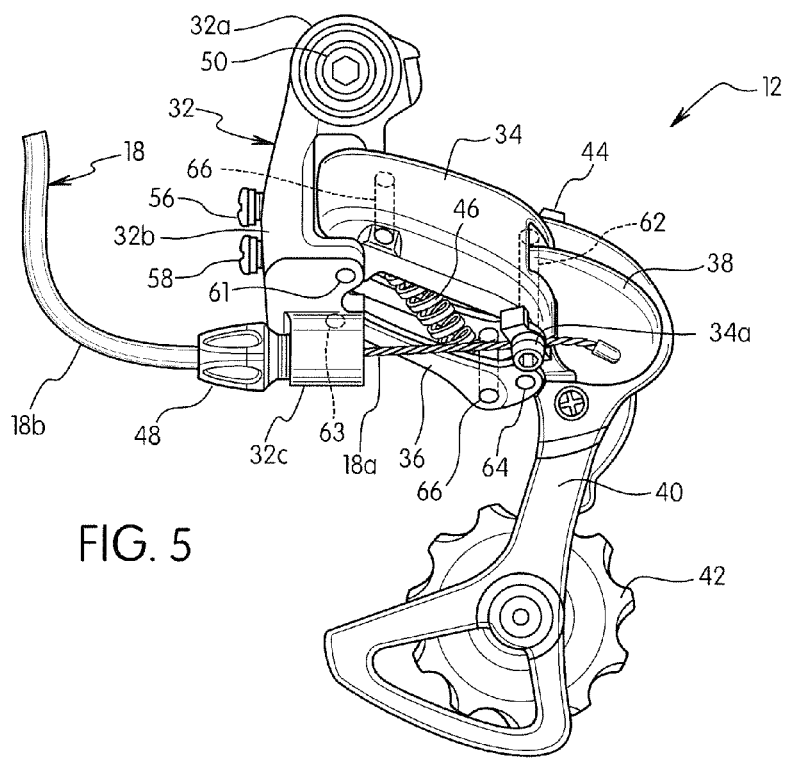
FIG. 5 is an enlarged side elevational view of the rear derailleur illustrated in the low shift stage position.
Figure 6:
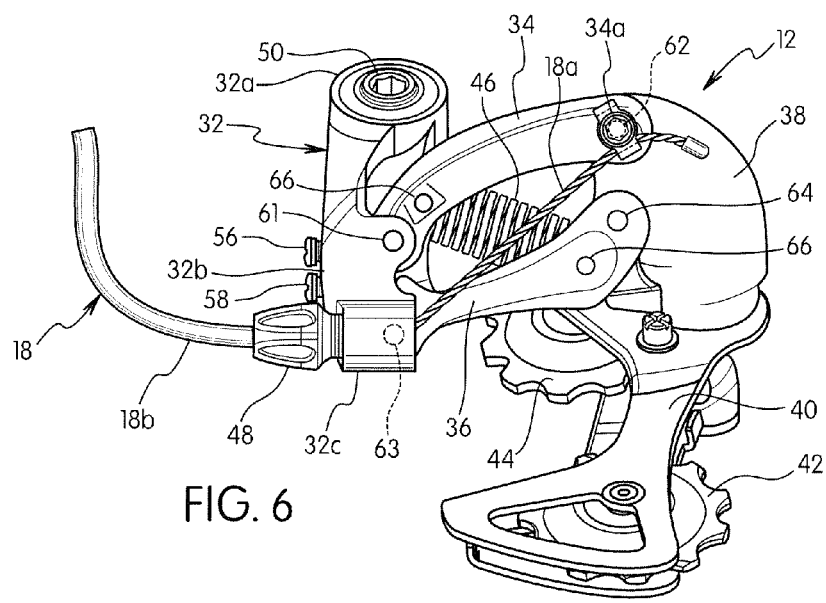
FIG. 6 is a perspective view of the rear derailleur illustrated in the top shift stage position.

As seen in FIGS. 4 and 5, the cable adjustment barrel 48 is threaded into a threaded hole of the cable attachment portion 32c such that the relative position of the outer casing 18b with respect to the base member 32 can be adjusted by the user. In other words, the user can adjust the tension of the inner wire by selectively turning cable adjustment barrel 48. The cable adjustment barrel 48 is a conventional structure, and thus, the cable adjustment barrel 48 will not be discussed in further detail herein.

Figure 7:
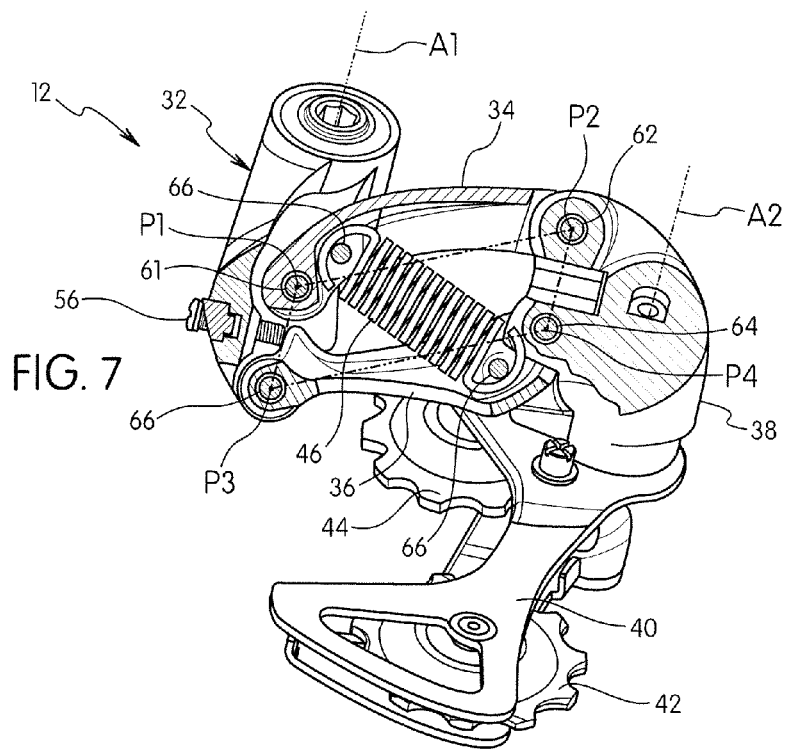
FIG. 7 is a perspective view of the rear derailleur illustrated in the top shift stage position, but with a portion broken away to illustrated the spring connection.
Figures 8, 9:
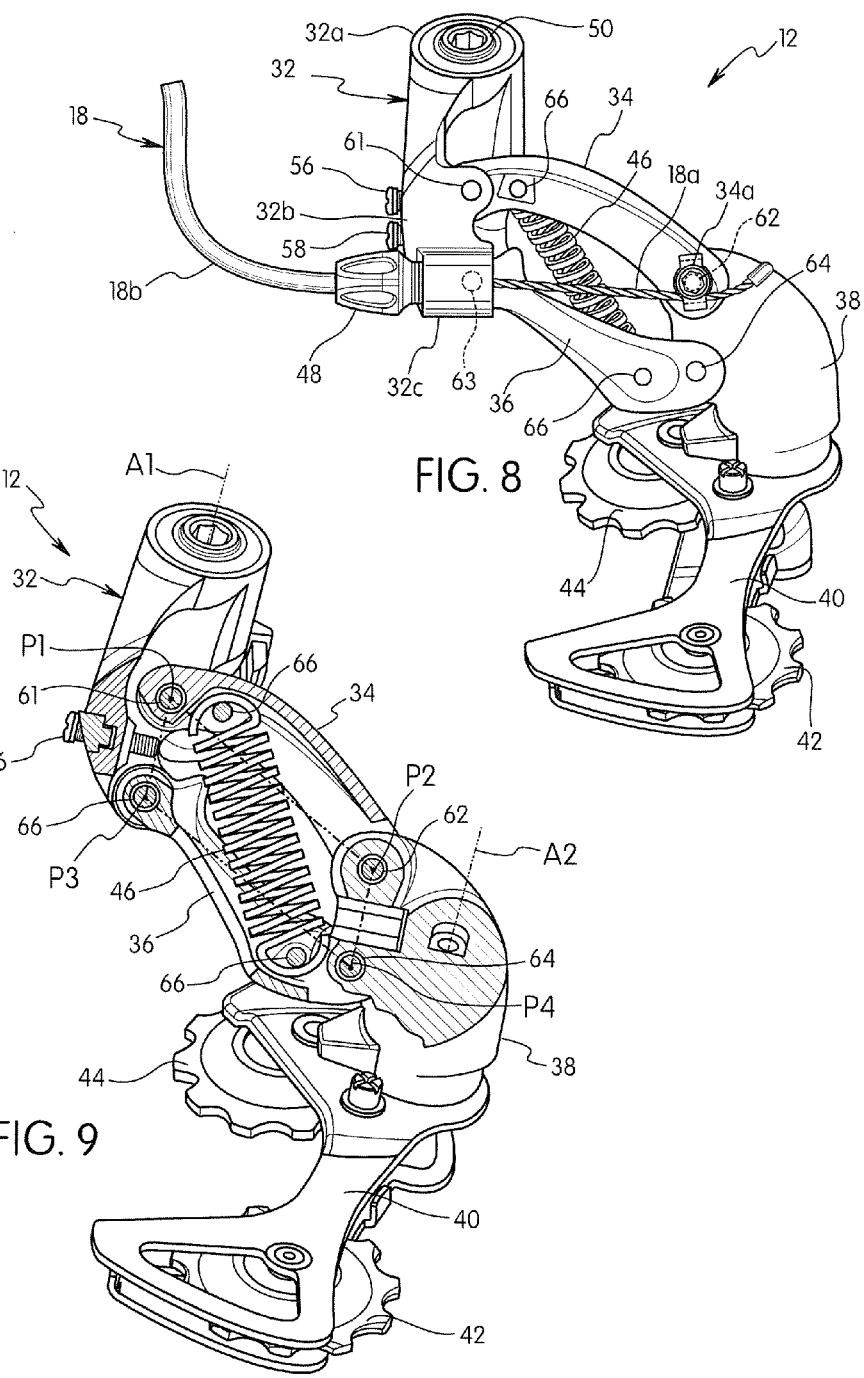
FIG. 8 is a perspective view of the rear derailleur illustrated in the low shift stage position.
FIG. 9 is a perspective view of the rear derailleur illustrated in the low shift stage position, but with a portion broken away to illustrated the spring connection.

As best seen in FIGS. 7 and 9, in the illustrated embodiment, the first and second link members 34 and 36 are pivotally mounted to the movable member 38 and the base member 32 such that define a four-bar parallelogram linkage having its corners defined by a first pivot axis P1, a second pivot axis P2, a third pivot axis P3 and a fourth pivot axis P4. The first and second link members 34 and 36 are preferably constructed of a hard rigid material such as a lightweight metal (e.g., an aluminum alloy). In the illustrated embodiment, the first link member 34 constitutes an outer link of the rear derailleur 12, while the second link member 36 constitutes an inner link of the rear derailleur 12. In particular, as used herein, the term "outer link" of a four-bar linkage refers to the link member that is farthest from a vertical longitudinal plane of the bicycle 10 with the rear derailleur 12 in the installed position. On the other hand, as used herein, the term "inner link" of a four-bar linkage refers to the link member that is closest from the vertical longitudinal plane of the bicycle 10 with the rear derailleur 12 in the installed position.

In the illustrated embodiment, the first link member 34 is provided with an inner wire attachment structure 34a for attaching the inner wire 18a. Here, the inner wire attachment structure 34a includes a threaded hole and a bolt with a washer. The inner wire attachment structure 34a is located on the first link member 34 such that the attachment point of the inner wire 18a to the wire attachment structure 34a is located along a line that interconnects the centers of the pivot axes P2 and P4 at least at some point during movement of the movable member 38 between a top shift stage position and a low shift stage position. In the illustrated embodiment, the attachment point of the inner wire 18a to the wire attachment structure 34a is located on the center of the pivot axis P2. Preferably, the attachment point of the inner wire 18a to the wire attachment structure 34a is not located within the four-bar parallelogram linkage defined by the pivot axes P1 to P4 while the movable member 38 is in the top shift stage position.

As best seen in FIGS. 7 and 9, a first end of the first link member 34 is pivotally mounted to the base member 32 by a pivot pin 61. Thus, the first end of the first link member 34 pivots relative to the base member 32 about the first pivot axis P1 that is defined by the pivot pin 61. A second end of the first link member 34 is pivotally mounted to the movable member 38 by a pivot pin 62. Thus, the second end of the first link member 34 pivots relative to the movable member 38 about the second pivot axis P2 that is defined by the pivot pin 62.

Still referring to FIGS. 7 and 9, a first end of the second link member 36 is pivotally mounted to the base member 32 by a pivot pin 63. Thus, the first end of the second link member 36 pivots relative to the base member 32 about the third pivot axis P3 that is defined by the pivot pin 63. A second end of the second link member 36 is pivotally mounted to the movable member 38 by a pivot pin 64. Thus, the second end of the second link member 36 pivots relative to the movable member 38 about the fourth pivot axis P4 that is defined by the pivot pin 64.

As seen in FIGS. 2 to 5, the movable member 38 is preferably constructed of a hard rigid material such as a lightweight metal (e.g., an aluminum alloy). The movable member 38 is movably supported to the base member 32 by the first and second link members 34 and 36 (the cable operated structure) to move between a plurality of shift stage positions with respect to the base member 32 as mentioned above. The movable member 38 pivotally supports the chain guide 40 for pivotal movement about a pivot axis A2, which is sometimes called the P-axis of the rear derailleur. As best seen in FIGS. 2 and 3, the chain guide 40 basically includes a pair of chain cage plates with the tension pulley 42 and the guide pulley 44 rotatably disposed between the chain cage plates.

As best seen in FIGS. 7 to 9, the biasing member 46 is interposed between the first and second link members 34 and 36 (the cable operated structure) such that the movable member 38 is biased towards one of the top shift stage position and the low shift stage position. In the illustrated embodiment, the biasing member 46 is a coil tension spring that biases the movable member 38 towards the top shift stage position. In particular, the biasing member 46 is connected to the first link member 34 by a first shaft or pin 66 and connected to the second link member 36 by a second shaft or pin 68. The pins 66 and 68 are diagonally arranged between the first and second link members 34 and 36 so that the first and second link members 34 and 36 are biased together. In other words, the biasing member 46 is stretched as the movable member 38 moves from the top shift stage position to the low shift stage position. In the top shift stage position, the biasing member 46 is preloaded (slightly stretched) so that the second link member 36 contacts the tip of the top shift stage adjustment screw 56 as seen in FIG. 7.

As seen in FIGS. 7 and 9, in the illustrated embodiment, the biasing member 46 is connected to the first and second link members 34 and 36 at points lying outside of a quadrilateral having its corners corresponding to the first, second, third and fourth pivot axes P1 to P4. The pins 66 and 68 are disposed between a first straight line which passes through the pivot axes P1 and P3, and a second straight line which is passes through the pivot axes P2 and P4. The pins 66 and 68 are not disposed between a third straight line which passes through the pivot axes P1 and P2, and a fourth straight line which is through the pivot axes passes P3 and P4. The biasing member 46 biases the movable member 38 in a direction with respect to the base member 32 such that the chain guide 40 is in the top shift stage position (i.e., a position closest to the base member 32).

With this arrangement of the pivot axes P1 to P4 of the link members 34 and 36 and the pins 66 and 68 connecting the biasing member 46 to the link members 34 and 36, a relatively consistent amount of operating energy is needed for shifting. Thus, the user feels that the same amount of force is needed for shifting between speeds in the rear gear shifting system of the bicycle 10. Thus, in the illustrated embodiment, the first, second, third and fourth pivot axes P1 to P4 are arranged relative to connection points of the pins 66 and 68 to the first and second link members 34 and 36 to balance the operation energy of shifting between each of the shift stages.

First, the balance the operation energy of shifting will be considered with respect to a percentage of a rate of change (difference) of operating energy in performing two adjacent shifting operations between three consecutive shift stage positions excluding shifting to and from the top and low shift stage positions. In the illustrated embodiment, the link members 34 and 36 (the cable operated structure) are coupled and arranged between the movable member 38 and the base member 32 such that the percentage of the rate of change of operating energy in two adjacent shifting operations between each three consecutive shift stage positions of the movable member 38 relative to the base member 32, excluding the top and low shift stage positions, is less than 3.7%, and more preferably less than 3.2%. Even more preferably, the percentage of the rate of change of operating energy between three consecutive shift stage positions, excluding the top and low shift stage positions, is less than 3% as in the construction of the illustrated embodiment.

The percentage of the rate of change of the operating energy for performing two adjacent shifting operations between three consecutive shift stage positions, excluding the top and low shift stage positions, can be determined as follows using Equation (1):

$$X=|E_1-E_2|/[(E_1+E_2)/2]\times 100(\%)$$

In Equation (1), X is the rate of change of the operating energy, $E_1$ is an operating energy for shifting between a N shift stage position and a N+1 shift stage position, and $E_2$ is an operating energy for shifting between a N+1 shift stage position and a N+2 shift stage position. In Equation (1), the N shift stage position excludes both the top and low shift stage positions and the N+2 shift stage position excludes both the top and low shift stage positions. Equation (1) can be more simply expressed in the following terms: $X=|E_1-E_2|/Eavg_1\times 100(\%)$, where X is the rate of change of the operating energy, $E_1$ is an operating energy for shifting between a N shift stage position and a N+1 shift stage position, $E_2$ is an operating energy for shifting between a N+1 shift stage position and a N+2 shift stage position, and $Eavg_1$ is average operation energy between the operating energies $E_1$ and $E_2$.

Now, the balance the operation energy of shifting will be considered with respect to the percentage of the rate of change (difference) of operating energy in performing a single shifting operation between adjacent shift stage positions excluding shifting to and from the top and low shift stage positions. In the illustrated embodiment, the link members 34 and 36 (the cable operated structure) are coupled and arranged between the movable member 38 and the base member 32 such that the percentage of the rate of change of operating energy in each of the shifting operations between adjacent shift stage positions of the movable member 38 relative to the base member 32, excluding the top and low shift stage positions, is less than 30%, and more preferably less than 20%. Even more preferably, the percentage of the rate of change of operating energy in each of the shifting operations between adjacent shift stage positions, excluding the top and low shift stage positions, is less than 10% as in the construction of the illustrated embodiment.

The percentage of the rate of change of the operating energy for performing each of the shifting operations between adjacent shift stage positions, excluding the top and low shift stage positions, can be determined as follows using Equation (2):

$$X = (E_{max} - E_{min})/\left[\left(\sum_{N=2}^{M} E_N\right)/M\right]\times 100(\%)$$

In Equation (2), X is the rate of change of the operating energy, $E_{max}$ is a maximum operating energy among operating energies $E_1, E_2, E_3, \ldots, E_M$, $E_{min}$ is a minimum operating energy among operating energies $E_1, E_2, E_3, \ldots, E_M$, $E_N$ is an operating energy for shifting between a N shift stage position and a N+1 shift stage position, and M is a total number of shift stage positions excluding the top and low shift stage positions. In Equation (2), the N shift stage position is one of the top and low shift stage positions. Equation (2) can be more simply expressed in the following terms: $X=|E_{max}-E_{min}|/Eavg_2\times 100(\%)$, where X is the rate of change of the operating energy, $E_{max}$ is a maximum operating energy among operating energies between the adjacent shift stage positions but excluding both the top and low shift stage positions, $E_{min}$ is a minimum operating energy among operating energies between the adjacent shift stage positions but excluding both the top and low shift stage positions, and $Eavg_2$ is average operation energy among operating energies between the adjacent shift stage positions but excluding both the top and low shift stage positions.

Now, the balance the operation energy of shifting will be considered with respect to the percentage of the rate of change (difference) of operating energy in performing a single shifting operation between adjacent shift stage positions including shifting to and from the top and low shift stage positions. In the illustrated embodiment, the link members 34 and 36 (the cable operated structure) are coupled and arranged between the movable member 38 and the base member 32 such that the percentage of the rate of change of operating energy in each shifting operations between adjacent shift stage positions of the movable member 38 relative to the base member 32, including the top and low shift stage positions, is less than 60%, and more preferably less than 40%. Even more preferably, the percentage of the rate of change of operating energy in each of the shifting operations between adjacent shift stage positions, including the top and low shift stage positions, is less than 20% as in the construction of the illustrated embodiment.

The percentage of the rate of change of the operating energy for performing each of the shifting operations between adjacent shift stage positions, including the top and low shift stage positions, can be determined as follows using Equation (3):

$$X = (E_{max} - E_{min})/\left[\left(\sum_{N=1}^{K} E_N\right)/K\right]\times 100(\%)$$

In Equation (3), X is the rate of change of the operating energy, $E_{max}$ is a maximum operating energy among operating energies $E_1, E_2, E_3, \ldots, E_K$, $E_{min}$ is a minimum operating energy among operating energies $E_1, E_2, E_3, \ldots, E_K$, $E_N$ is an operating energy for shifting between a N shift stage position and a N+1 shift stage position, and K is a total number of all shift stages including the top and low shift stage positions. In Equation (3), the N shift stage position is one of the top and low shift stage positions. Equation (3) can be more simply expressed in the following terms: $X=|E_{max}-E_{min}|/Eavg_3\times 100(\%)$, where X is the rate of change of the operating energy, $E_{max}$ is a maximum operating energy among operating energies between the adjacent shift stage positions but excluding both the top and low shift stage positions, $E_{min}$ is a minimum operating energy among operating energies between the adjacent shift stage positions but excluding both the top and low shift stage positions, and $Eavg_3$ is average operation energy among operating energies between the adjacent shift stage positions but including both the top and low shift stage positions.

While only selected embodiments have been chosen to illustrate the present invention, it will be apparent to those skilled in the art from this disclosure that various changes and modifications can be made herein without departing from the scope of the invention as defined in the appended claims. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle rear derailleur comprising:
    a base member including a bicycle mounting portion;
    a cable operated structure movably coupled to the base member, the cable operated structure including a first link member and a second link member the first link member being connected to the base member by a first pivot pin and the second link member being connected to the base member by a second pivot pin; and
    a movable member movably supported to the base member by the cable operated structure between a plurality of shift stage positions with respect to the base member, the plurality of shift stage positions including a top shift stage position, a low shift stage position and at least three shift stage positions between the top shift stage position and the low shift stage position, the movable member being connected to the first link member by a third pivot pin and the connected to the second link member by a fourth pivot pin; and
    a biasing member connected to the first and second link members at points lying outside of a quadrilateral having corners corresponding to first, second, third and fourth pivot axes of the first, second, third and fourth pivot pins, respectively, such that a percentage of a rate of change of operating energy in two adjacent shifting operations between each three consecutive shift stage positions of the movable member relative to the base member excluding the top and low shift stage positions is less than 3.7%, the percentage of the rate of change of the operating energy being determined as follows $$X=|E_1-E_2|/E\mathrm{avg}_1\times100(\%)$$

where X is the rate of change of the operating energy,
    $E_1$ is an operating energy for shifting between a N shift stage position and a N+1 shift stage position, wherein the N shift stage position excludes both the top and low shift stage positions, and
    $E_2$ is an operating energy for shifting between a N+1 shift stage position and a N+2 shift stage position, wherein the N+2 shift stage position excludes both the top and low shift stage positions, and
    $E\mathrm{avg}_1$ is average operation energy between the operating energies $E_1$ and $E_2$,
    the cable operated structure including a first link member and a second link member coupling the movable member and the base member, and including a biasing member operatively connected between the first link member and the second link member such that the movable member is biased towards one of the top and low shift stage positions, the biasing member being configured to generate a biasing force, and at least one of the first and second link members being configured to be moved between adjacent shift stage positions by a cable, such that the biasing member via the biasing force and the at least one of the first and second links via a distance moved by the cable between adjacent shift stage positions are configured to affect the operating energy.

2. The bicycle rear derailleur according to claim 1, wherein the cable operated structure is further coupled and arranged between the movable member and the base member such that the percentage of the rate of change of the operating energy is less than 3.2%.

3. The bicycle rear derailleur according to claim 1, wherein the first link member has a first end pivotally mounted to the base member about the first pivot axis and a second end pivotally mounted to the movable member about the second pivot axis, the second link member has a first end pivotally mounted to the base member about the third pivot axis and a second end pivotally mounted to the movable member about the fourth pivot axis.

4. The bicycle rear derailleur according to claim 1, wherein the biasing member is a tension spring.

5. The bicycle rear derailleur according to claim 1, further comprising
    a chain guide pivotally attached to the movable member.

6. The bicycle rear derailleur according to claim 5, wherein the biasing member biases the movable member in a direction with respect to the base member such that the chain guide is in a position closest to the base member.

7. The bicycle rear derailleur according to claim 3, wherein the first and second link members are pivotally mounted to the movable member and the base member such that define a four-bar parallelogram linkage.

8. A bicycle rear derailleur comprising:
    a base member including a bicycle mounting portion;
    a cable operated structure movably coupled to the base member, the cable operated structure including a first link member and a second link member, the first link member being connected to the base member by a first pivot pin and the second link member being connected to the base member by a second pivot pin; and
    a movable member movably supported to the base member by the cable operated structure between a plurality of shift stage positions with respect to the base member, the plurality of shift stage positions including a top shift stage position, a low shift stage position and at least four shift stage positions between the top shift stage position and the low shift stage position, the movable member being connected to the first link member by a third pivot pin and the connected to the second link member by a fourth pivot pin; and
    a biasing member connected to the first and second link members at points lying outside of a quadrilateral having corners corresponding to pivot axes of the first, second, third and fourth pivot pins, such that a percentage of a rate of change of operating energy in each shifting operations between adjacent shift stage position of the movable member relative to the base member excluding the top and low shift stage positions is less than 30%, the percentage of the rate of change of the operating energy being determined as follows $$X=|E_{max}-E_{min}|/E\mathrm{avg}_2\times100(\%)$$

where X is the rate of change of the operating energy,
    $E_{max}$ is a maximum operating energy among operating energies between the adjacent shift stage positions excluding both the top and low shift stage positions, $E_{min}$ is a minimum operating energy among operating energies between the adjacent shift stage positions excluding both the top and low shift stage positions, $Eavg_2$ is average operation energy among operating energies between the adjacent shift stage positions excluding both the top and low shift stage positions, the cable operated structure including a first link member and a second link member coupling the movable member and the base member, and including a biasing member operatively connected between the first link member and the second link member such that the movable member is biased towards one of the top and low shift stage positions, the biasing member being configured to generate a biasing force, and at least one of the first and second link members being configured to be moved between adjacent shift stage positions by a cable, such that the biasing member via the biasing force and the at least one of the first and second links via a distance moved by the cable between adjacent shift stage positions are configured to affect the operating energy.

9. The bicycle rear derailleur according to claim 8, wherein the cable operated structure is coupled and arranged between the movable member and the base member such that the percentage of the rate of change of the operating energy is less than 20%.

10. A bicycle rear derailleur comprising:

a base member including a bicycle mounting portion;

a cable operated structure movably coupled to the base member, the cable operated structure including a first link member and a second link member, the first link member being connected to the base member by a first pivot pin and the second link member being connected to the base member by a second pivot pin; and a movable member movably supported to the base member by the cable operated structure between a plurality of shift stage positions with respect to the base member, the plurality of shift stage positions including a top shift stage position, a low shift stage position and at least four shift stage positions between the top shift stage position and the low shift stage position, the movable member being connected to the first link member by a third pivot pin and the connected to the second link member by a fourth pivot pin; and a biasing member connected to the first and second link members at points lying outside of a quadrilateral having corners corresponding to pivot axes of the first, second, third and fourth pivot pins, such that a percentage of a rate of change of operating energy in each shifting operations between each adjacent shift stage position of the movable member relative to the base member including the top and low shift stage positions is less than 60%, the percentage of the rate of change of the operating energy being determined as follows $$X=|E_{max}-E_{min}|/Eavg_3\times100(\%)$$

where X is the rate of change of the operating energy, $E_{max}$ is a maximum operating energy among operating energies between the adjacent shift stage positions excludes both the top and low shift stage positions, $E_{min}$ is a minimum operating energy among operating energies between the adjacent shift stage positions excludes both the top and low shift stage positions, $Eavg_3$ is average operation energy among operating energies between the adjacent shift stage positions including both the top and low shift stage positions the cable operated structure including a first link member and a second link member coupling the movable member and the base member, and including a biasing member operatively connected between the first link member and the second link member such that the movable member is biased towards one of the top and low shift stage positions, the biasing member being configured to generate a biasing force, and at least one of the first and second link members being configured to be moved between adjacent shift stage positions by a cable, such that the biasing member via the biasing force and the at least one of the first and second links via a distance moved by the cable between adjacent shift stage positions are configured to affect the operating energy.

11. The bicycle rear derailleur according to claim 10, wherein the cable operated structure is coupled and arranged between the movable member and the base member such that the percentage of the rate of change of the operating energy is less than 40%.

12. A bicycle rear derailleur comprising:

a base member including a bicycle mounting portion;

a cable operated structure including a first link member and a second link member; and a movable member movably supported to the base member by the first and second link members to move between a plurality of shift stage positions with respect to the base member; and a biasing member interposed between the first and second link members such that the movable member is biased towards one of a top shift stage position and a low shift stage position, the first link member having a first end pivotally mounted to the base member about a first pivot axis and a second end pivotally mounted to the movable member about a second pivot axis, the second link member having a first end pivotally mounted to the base member about a third pivot axis and a second end pivotally mounted to the movable member about a fourth pivot axis, the biasing member being connected to the first and second link members at points lying outside of a quadrilateral having corners corresponding to the first, second, third and fourth pivot axes, such that a percentage of a rate of change of operating energy in each shifting operations between each adjacent shift stage position of the movable member relative to the base member including the top and low shift stage positions is less than 60%.

* * * * *